(12) United States Patent
Wada

(10) Patent No.: US 6,705,797 B1
(45) Date of Patent: Mar. 16, 2004

(54) PAVING BLOCK AND ITS INSTALLATION METHOD

(75) Inventor: Shohei Wada, Kagawa (JP)

(73) Assignee: Nihon Kogyo Co., Ltd., Kagawa (JP)

( * ) Notice: Subject to any disclaimer, the term of this patent is extended or adjusted under 35 U.S.C. 154(b) by 0 days.

(21) Appl. No.: 09/700,723

(22) PCT Filed: Jul. 4, 2000

(86) PCT No.: PCT/JP00/02263

§ 371 (c)(1),
(2), (4) Date: Nov. 28, 2000

(87) PCT Pub. No.: WO00/61868

PCT Pub. Date: Oct. 19, 2000

(30) Foreign Application Priority Data

Apr. 7, 1999 (JP) ............................................. 11-099998
Sep. 29, 1999 (JP) ............................................. 11-275647

(51) Int. Cl.$^7$ ................................................. E01C 5/00
(52) U.S. Cl. .............................. 404/38; 404/34; 404/41; 52/603; 52/604; 52/605
(58) Field of Search .............................. 404/17, 34, 38, 404/39, 41, 50; 52/596, 603, 604, 605; D25/113; 14/2.4

(56) References Cited

U.S. PATENT DOCUMENTS

| | | | | |
|---|---|---|---|---|
| 31,093 A | * | 1/1861 | Smith | 404/41 |
| 146,019 A | * | 12/1873 | Perrin | 404/38 |
| 378,825 A | * | 2/1888 | Brannigan | 404/34 |
| 436,989 A | * | 9/1890 | McDowell | 404/41 |
| 929,210 A | * | 7/1909 | Grebe | 404/38 |
| 1,439,446 A | * | 12/1922 | Reagan | 52/603 |
| RE17,020 E | * | 7/1928 | Healy | 404/41 |
| RE18,188 E | * | 9/1931 | Benedict et al. | 404/50 |
| 1,854,396 A | * | 4/1932 | Davis | 52/483.1 |
| 3,640,191 A | * | 2/1972 | Hendrich | 404/41 |
| 4,766,020 A | * | 8/1988 | Ellingson, Jr. | 428/54 |
| 5,503,498 A | | 4/1996 | Scheiwiller | |
| 5,903,943 A | * | 5/1999 | Sherrod | 14/2.4 |
| 5,924,152 A | * | 7/1999 | Maier | 14/2.4 |
| D448,859 S | * | 10/2001 | Doman | D25/113 |

FOREIGN PATENT DOCUMENTS

| | | |
|---|---|---|
| JP | 52-57404 | 10/1975 |
| JP | 8260406 | 10/1996 |
| JP | 8333705 | 12/1996 |
| JP | 3045073 | 1/1998 |
| JP | 3048638 | 5/1998 |
| JP | 3049404 | 6/1998 |

* cited by examiner

*Primary Examiner*—Gary S. Hartmann
(74) *Attorney, Agent, or Firm*—Radar, Fishman & Grauer PLLC

(57) ABSTRACT

A paving block and a paving block assembly include a prism-shaped paving block body having a top surface, a bottom surface disposed opposite the top surface and a first pair of opposing side walls and a second pair of opposing side walls. The first and second pair of opposing side walls are disposed between the top and bottom surfaces with respective ones of the first pair of opposing side walls and the second pair of opposing side walls connected perpendicularly to each other. The top surface has a plurality of longitudinal grooves which are formed therein and extend parallel to each other. Each one of the plurality of grooves has a width substantially equal to each other. The paving block body has at least one projection connected to one of the side walls and positioned between the top and bottom surfaces. The at least one projection projects from the one side wall a distance equal to or substantially equal to the width of the grooves.

4 Claims, 11 Drawing Sheets

(a)

(b)

Fig.8
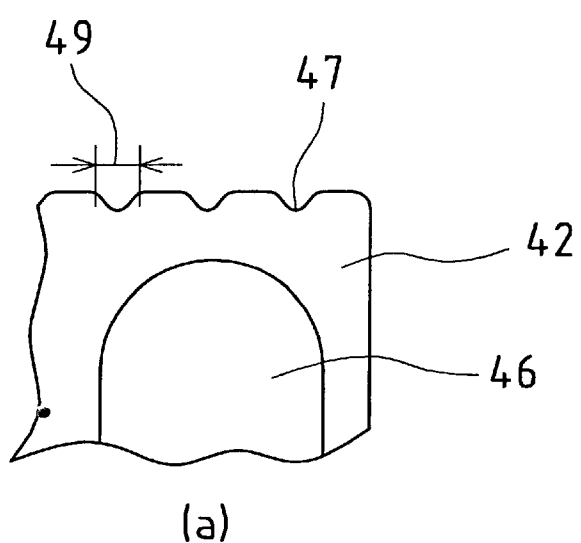
(a)
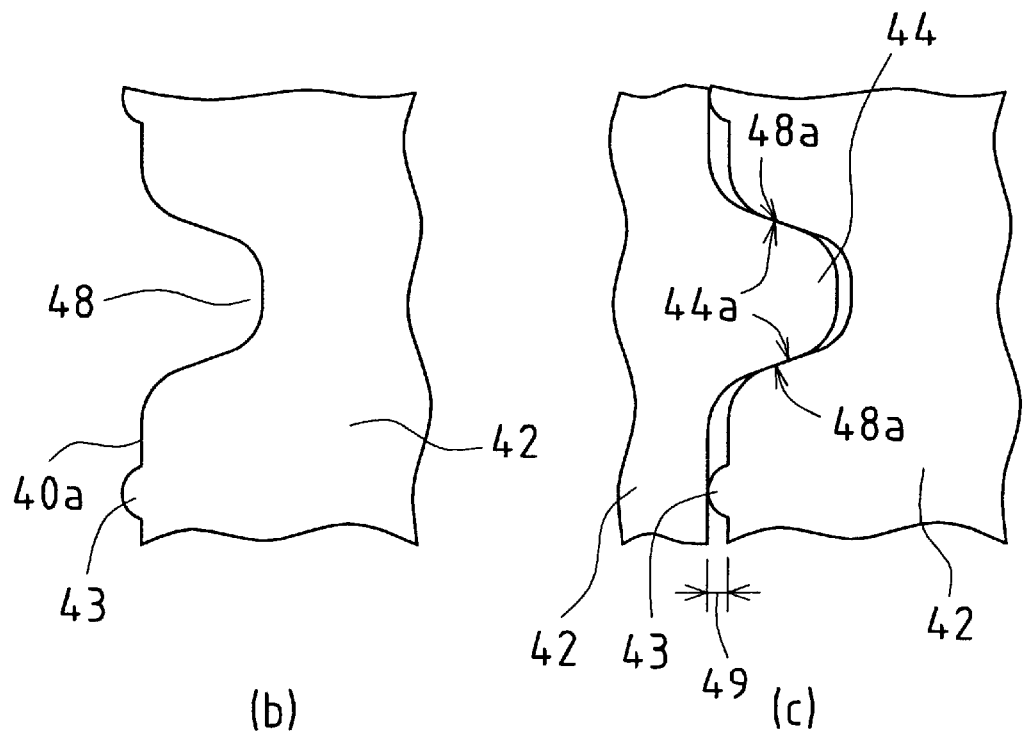
(b) (c)

Fig.9
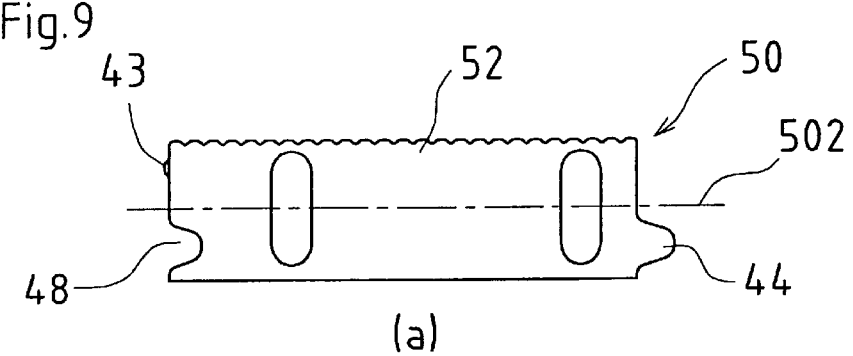
(a)
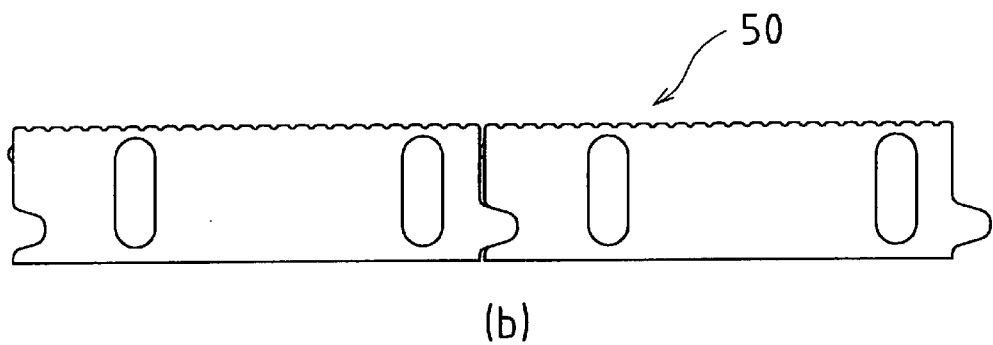
(b)
Fig.10
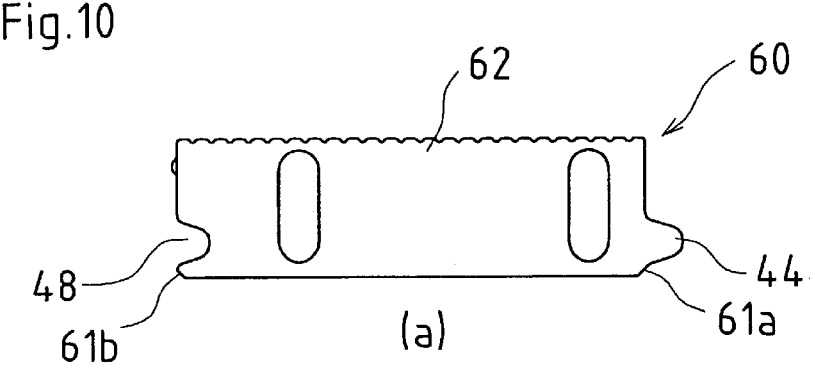
(a)
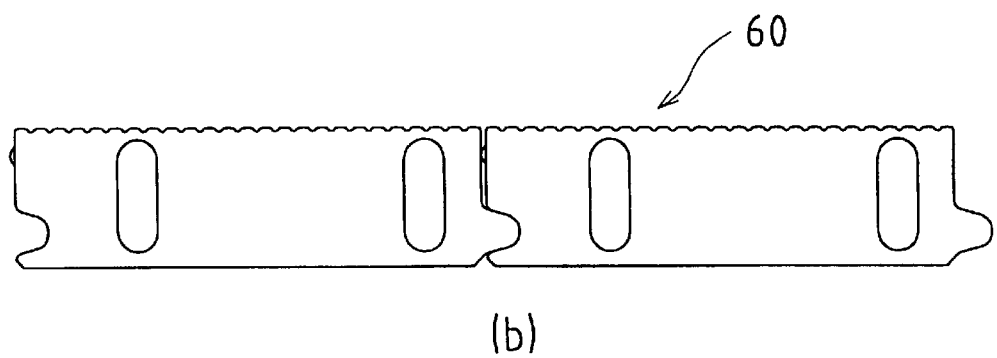
(b)

Fig.13
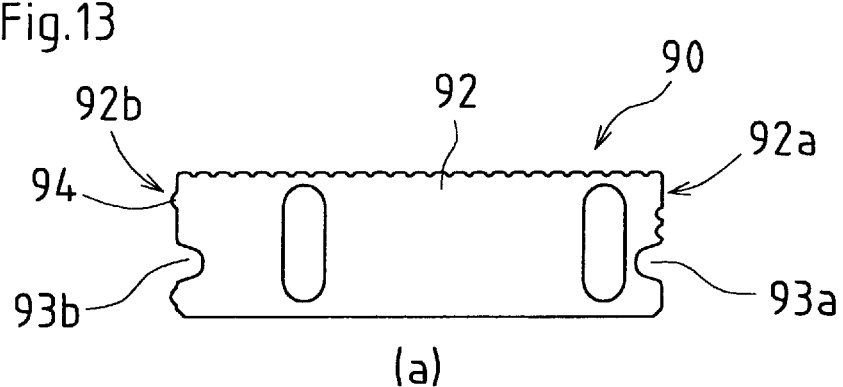
(a)
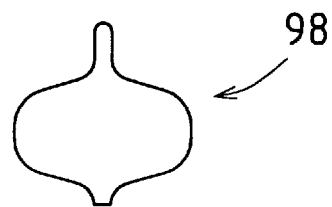
(b)
Fig.14
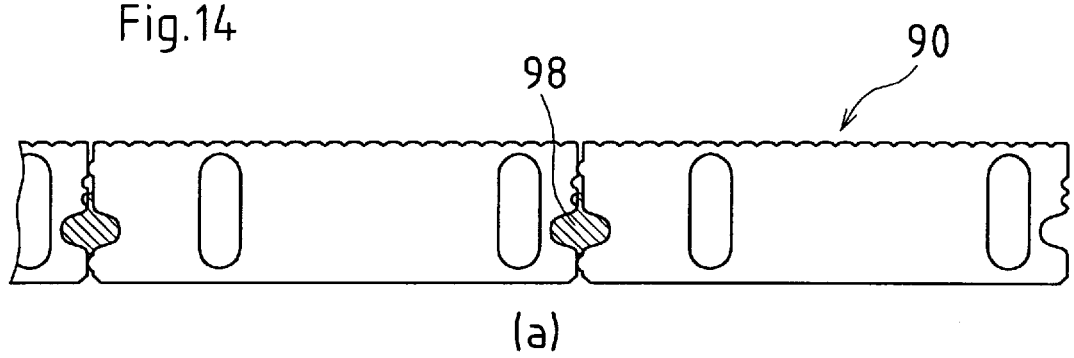
(a)
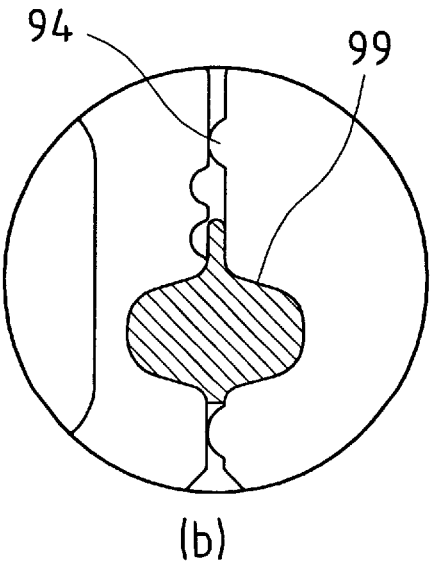
(b)

Fig.15
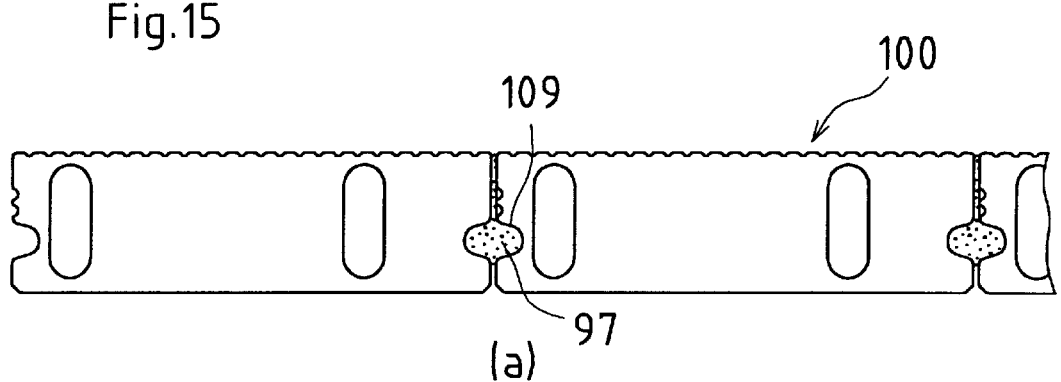
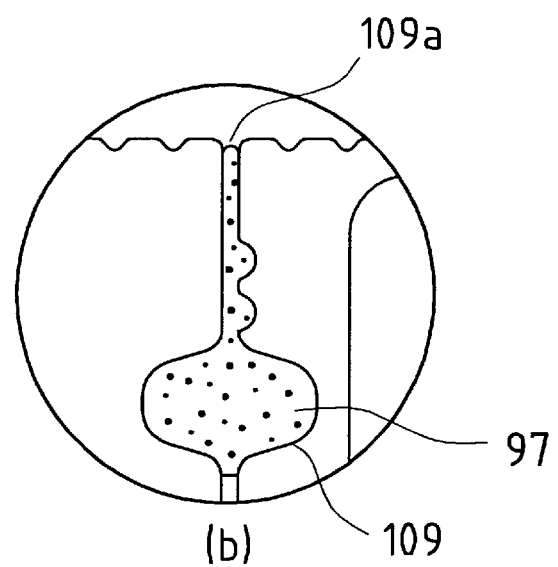

Fig.16
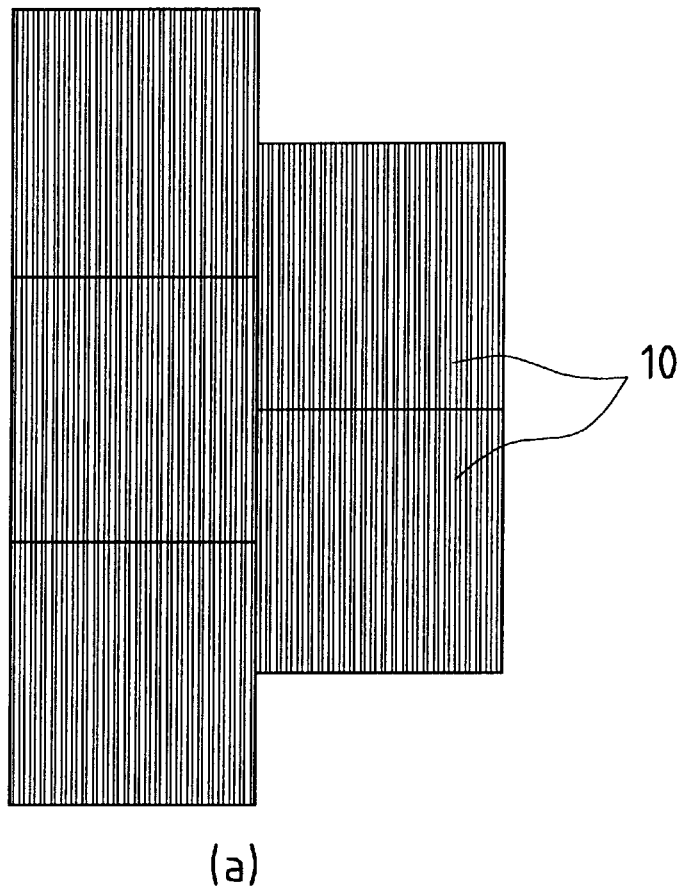
(a)
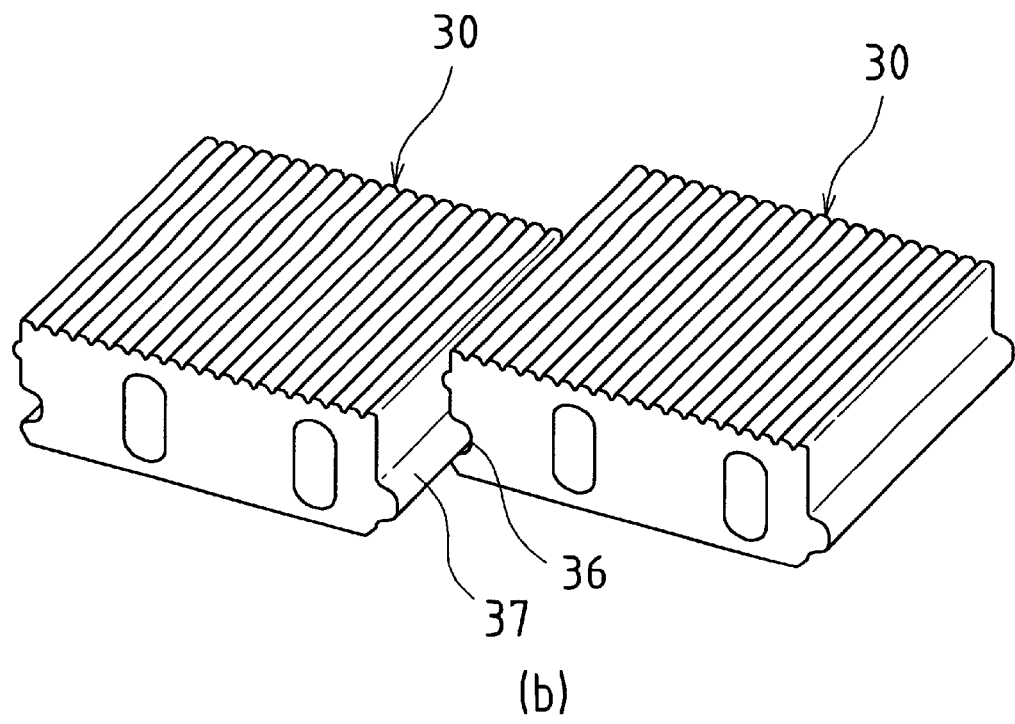
(b)

PAVING BLOCK AND ITS INSTALLATION METHOD

TECHNICAL FIELD

The present invention relates to a paving block used in a public space such as a sidewalk along a general road, a park promenade and a station square, and its installation method.

BACKGROUND ART

For the passage of pedestrians on a pavement or in a public space, block-shaped paving materials have been laid on a bed of sand, mortar, etc. Where the conventional block-shaped paving materials, which are chamfered at the peripheral of their surfaces by about 3 to 5 mm, are laid down, a groove with a width of about 8 to 15 mm is created between neighboring paving materials. Regrettably, in the case of a vehicle equipped with relatively small-diameter wheels and possessing a poor cushioning property, such as a wheelchair and a pushchair, when the vehicle travels on this pavement, it receives unwanted shakes deriving from the grooves between the paving materials. Besides, due to a load unevenly focused on a part of the paving materials or due to subsidence beneath the paving materials, the laid paving materials become wobbly or slanted. This causes a bump or unevenness over the paving materials, which is dangerous for the traffic of pedestrians, wheelchairs, pushchairs and the like.

Besides, the block-shaped paving material usually has smooth and flat surfaces and gets slippery in a rainy or wet condition. Since such paving material is dangerous at an inclined area, another type of paving materials having an anti-slip rugged surface are additionally laid down. For this construction, two types of paving materials, i.e. smooth/flat-surface paving materials and rugged-surface paving materials, should be available at an installation site. It is not only bothering to reserve these paving materials but also troublesome to carry out the installation process.

In order to solve the above problems, the present invention intends to provide a paving block and its installation method, which gives no unwanted shakes to a vehicle such as a wheelchair and a pushchair, which creates no bump or surface unevenness, and which is easy to install.

DISCLOSURE OF THE INVENTION

In order to achieve the above objects, the paving block of the present invention comprises the constitutions described below.

A paving block according to claim 1 of the present invention (hereinafter as Invention 1) comprises a prism-shaped paving block base, which has a top surface entirely formed with a plurality of grooves running parallel to each other.

A paved surface laid with the paving blocks of this constitution allows passage of a vehicle with small-diameter wheels and a poor cushioning property such as a wheelchair and a pushchair, with wobbliness and shakes being alleviated at joints between the paving blocks and hardly transmitted to the vehicle.

In a preferable constitution, a groove interval between adjacent grooves is substantially equal to each other. With the blocks being laid next to each other, an interval from a joint defined between the adjacent blocks to a groove next to the joint is equal to the groove interval.

This constitution further decreases the wobbliness and shakes at the joints.

Besides, the block base may have a smooth and flat bottom surface.

This constitution provides dual use according to the conditions and enables simple installation. For example, the smooth and flat surface can be presented as the top surface. On the other hand, at an inclined, slippery and dangerous place, the grooved surface with a plurality of grooves can make the top surface.

Further preferably, each groove has a width of 3 to 10 mm, and adjacent grooves define therebetween a ridge having a width of 3 to 20 mm. The wobbliness and shakes at the joint are alleviated and hardly transmitted to a vehicle.

In the paving block according to Invention 1 constructed as above, the block base has side walls which serve as adjacent surfaces in the block base, wherein one of these side walls is formed with a rib to engage the block base with an adjacent block base, and the other side wall is formed with an engaging groove to engage with a rib of another adjacent block base.

In installing the paving blocks of this constitution, the rib of one paving block base is engaged with the engaging groove of another paving block base. Thereby, the adjacent paving blocks are integrated together with the height of the paving blocks aligned. Consequently, even when a heavy load is imposed on a single paving block, the load is dispersed over the adjacent paving blocks and less likely to cause a bump or surface unevenness due to settlement or inclination.

In a preferable constitution, each of the rib and the engaging groove has a trapezoidal cross section, and the rib is greater in width than the engaging groove. When the block bases are laid next to each other, the rib and the engaging groove which are intended to engage together establish face-to-face contact at inclined surfaces thereof.

This constitution strengthens the engagement between adjacent paving blocks and ensures distribution of a load from one paving block to adjacent paving blocks. In addition, the adjacent paving blocks are aligned in height to create a level surface, allowing vehicles to travel more quietly.

It is also desirable that, with the blocks being laid next to each other, adjacent blocks define a predetermined width of joint between side walls thereof.

At the time of installation, this constitution can provide a certain width of joint between adjacent paving blocks in a simple manner, thus facilitating the installation.

Moreover, a projection for determining the joint width can extend perpendicularly from at least one side wall formed with the rib or the engaging groove.

This constitution simplifies the formation of joints in a predetermined width.

Another projection for determining the joint width may also extend from a side wall which has neither the rib nor the engaging groove.

Owing to this constitution, any adjacent paving blocks, regardless of their orientation, can provide a certain width of joint therebetween in a simpler manner.

Moreover, in the paving block according to Invention 1, each of opposing side walls which serve as adjacent surfaces in the block base may have a recess which cooperates with an adjacent block base to define a joint portion. In this case, it is possible to provide a joint component which is engageable in the joint portion defined by each adjacent recess.

Consequently, two paving blocks can define a joint portion by facing the recesses to each other. Installation can be conducted by means of a joint component or a joint material as required.

A paving block installation method of the present invention is an installation method for laying the paving blocks of the above constitutions, and characterized in that the paving blocks are laid on a road surface by engaging the engaging groove of one block with the rib of an adjacent block in a staggered manner.

In this installation method, provided each paving block is arranged such that the grooves run diagonally with respect to a direction of foot- or vehicle-traffic, the diagonal angle is preferably from 20 to 70 degrees.

These constitutions serve to suppress bounces of wheels of a passing vehicle and thereby to cushion the shock during the groove crossing. As a result, a vehicle is not affected by shakes, etc.

As the installation methods for laying the paving blocks each formed with a recess for the joint portion, there are employed a method of laying each paving block together with the others by engaging a joint component into the joint portion, or a method of laying each paving block together with the others by filling a joint material into the joint portion. Hence, the installation mode of the paving blocks can be suitably selected.

BRIEF DESCRIPTION OF THE DRAWINGS

FIG. 8 includes enlarged views of substantial portions of FIG. 7, wherein FIGS. 8(a) and 8(b) are enlarged views of the end A and the end B, respectively, and FIG. 8(c) depicts an installation thereof.

FIG. 9(a) is a side view of a paving block according to the fifth embodiment of the present invention, and FIG. 9(b) is a side view showing an installation of the fifth embodiment.

FIG. 10(a) is a side view of a paving block according to the sixth embodiment of the present invention, and FIG. 10(b) is a side view showing an installation of the sixth embodiment.

FIG. 13(a) is a side view of a paving block according to the ninth embodiment of the present invention, and FIG. 13(b) is a front view of a joint component used in the ninth embodiment.

FIG. 14(a) is a side view showing an installation of the paving blocks according to the ninth embodiment, and FIG. 14(b) is an enlarged view of a joint portion.

FIG. 15(a) is a side view showing another installation of paving blocks according to the ninth embodiment, and FIG. 15(b) is an enlarged view of a joint portion.

FIG. 16(a) is a top view of a first laying pattern by an installation method for the paving blocks according to any of the third to the ninth embodiments, and FIG. 16(b) is a perspective view of a substantial portion thereof.

BEST MODE FOR CARRYING OUT THE INVENTION

Embodiments of the paving block of the present invention are described with reference to the drawings.

<Description of Paving Blocks: Embodiments 1 to 9>

Figure 1:
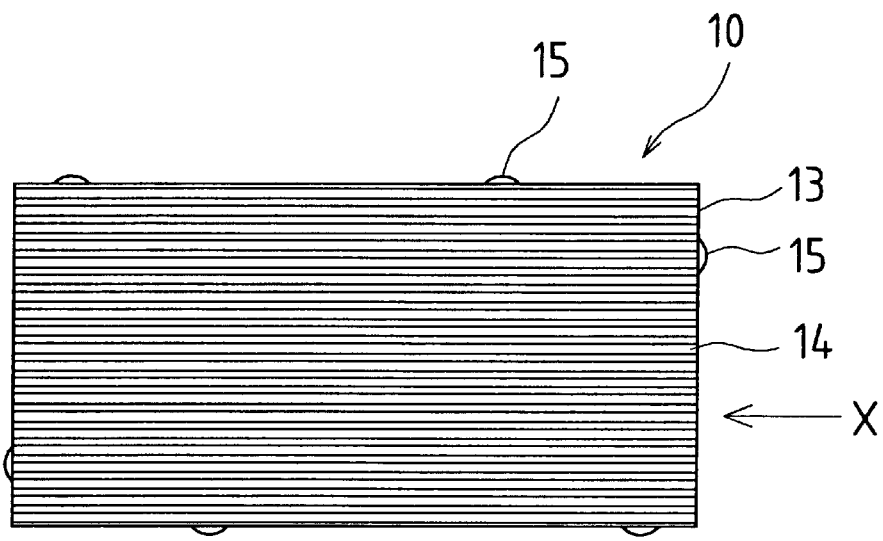
FIG. 1 is a plan view of a paving block according to the first embodiment of the present invention.
Figure 2:
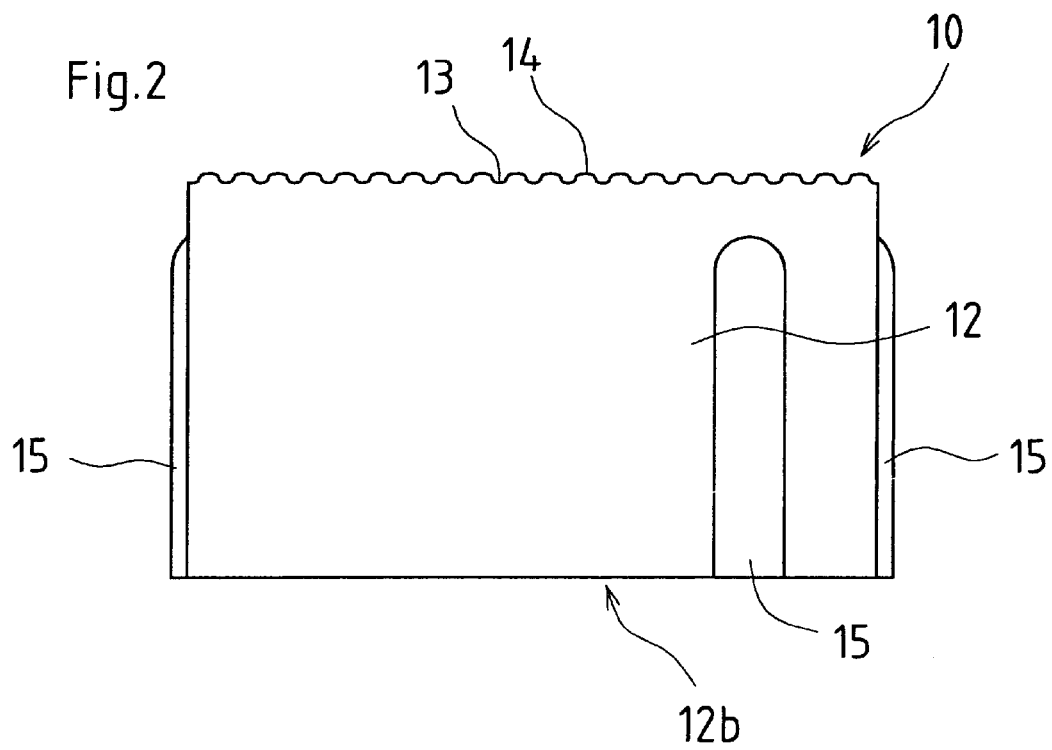
FIG. 2 is a side view of FIG. 1 taken in the direction of Arrow X.

FIG. 1 is a plan view of a paving block according to the first embodiment of the present invention, and FIG. 2 is a side view of FIG. 1 taken in the direction of Arrow X.

A paving block 10 is composed of a paving block base 12 of quadrangular prism shape and projections 15 for determining a joint width. The projections 15 are provided on side walls of the paving block base 12, each of which wall serves as an adjacent surface when installed. A plurality of grooves 13 are formed entirely across the top surface of the paving block base 12, each extending parallel to one side of the rectangular top surface and in an equal groove interval. The grooves 13 have a width of about 3 to 10 mm and a depth of about 0.5 to 10 mm.

The paving blocks 10 are laid next to each other, with the presence of the projections 15 provided on the side walls. Referring to the laying pattern shown in FIG. 17, for example, a joint 16a is defined between adjacent blocks 10a, 10b, and an interval x from the joint 16a to a groove adjacent to the joint 16a is equal to the above groove interval.

The paving block base 12 has a smooth and flat bottom surface 12b.

The paving block base 12 is made of, but not limited to, an inorganic substance such as concrete and tile. They can be also made of a synthetic resin-based material such as FRP and resin concrete. In terms of dimension, the paving block base 12 has a side of 100 to 500 mm and a thickness of 10 to 80 mm.

Figure 3:
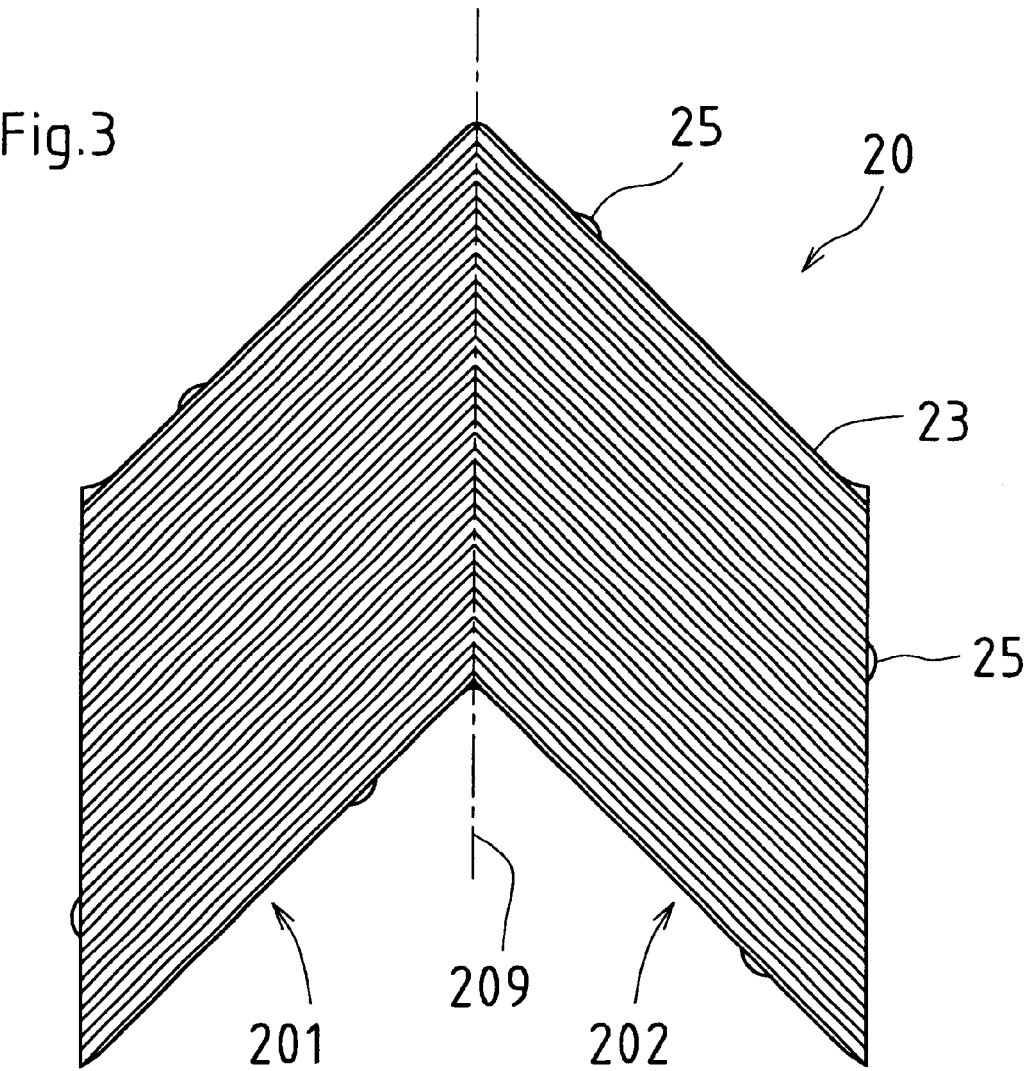
FIG. 3 is a plan view of a paving block according to the second embodiment of the present invention.

This paving block 10 is shaped in a prism having a rectangular bottom surface. It is also possible to apply a prism-structure with a bottom surface configuration as shown in FIG. 3, which is hereinafter described as the second embodiment. A paving block 20 has a symmetrical polygonal shape whose line of symmetry 209 extends through opposite parallelograms. Similar to the paving block 10, the paving block 20 comprises projections 25 formed on the side walls to determine a joint width. A plurality of grooves 23 are also formed entirely across its top surface. The plurality of grooves 23 run parallel to sides 201, 202 of the polygonal top surface, and communicate with each other at the line of symmetry 209.

Figure 4:
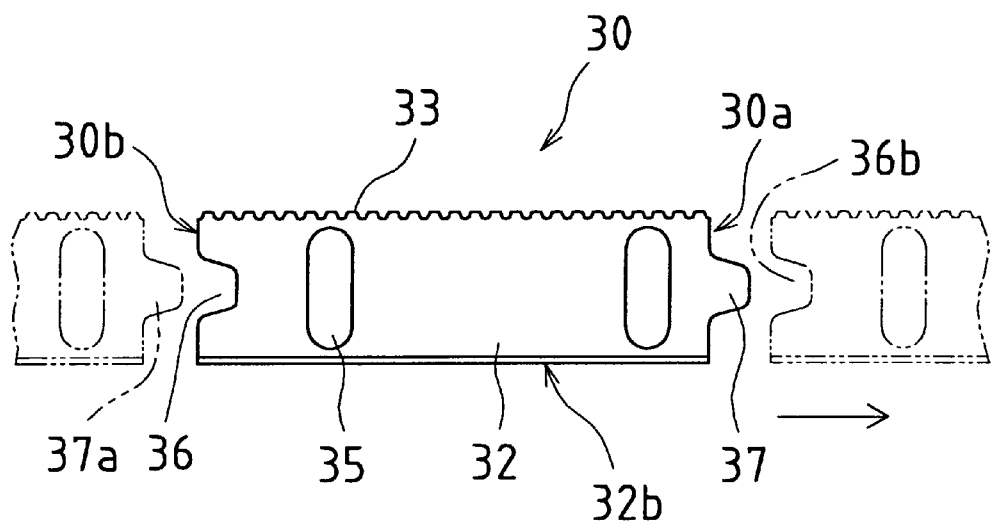
FIG. 4 is a side view of a paving block according to the third embodiment of the present invention.

Next, the description turns to the third embodiment, whose side view is illustrated in FIG. 4.

Similar to the paving block 10, a paving block 30 is composed of a paving block base 32 of quadrangular prism shape and projections 35 for determining a joint width. The projections 35 are provided on side walls of the paving block base 32, each of which wall serves as an adjacent surface when installed. A plurality of grooves 33 are formed entirely across the top surface of the paving block base 32, each extending parallel to one side of the rectangular top surface and in an equal groove interval. The width and depth of the grooves are the same as those in the paving block 10.

The paving block base 32 is made of, but not limited to, an inorganic substance such as concrete and tile. They can be also made of a synthetic resin-based material such as FRP and resin concrete. The dimension of the paving block base 32 is the same as in the case of the paving block 10.

Figure 5:
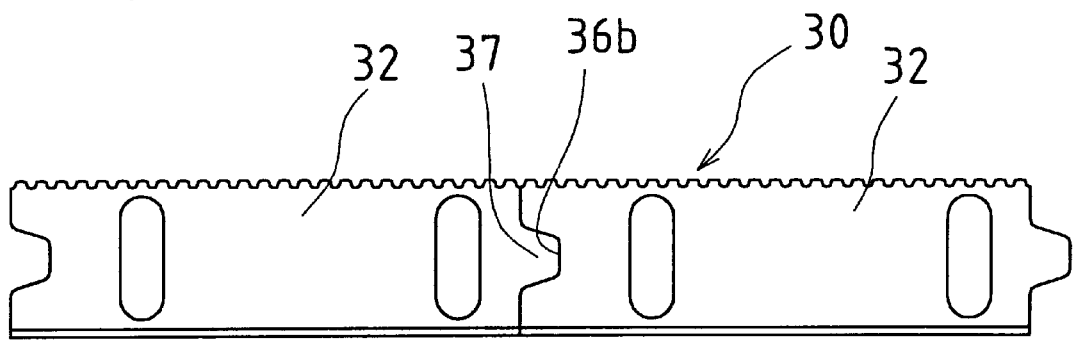
FIG. 5 is a side view showing an installation of paving blocks according to the third embodiment.

A side wall 30a which serves as an adjacent surface in the paving block base 32 is formed with a rib 37 which is engageable with an engaging groove 36b in an adjacent paving block base. An opposite side wall 30b is formed with an engaging groove 36 which is engageable with a rib 37a of another adjacent paving block base. The rib 37 and the engaging groove 36 have near-trapezoid cross sections. The corners of the trapezoid may be either angular or round. The trapezoid has a gradient in the range of 5 to 60 degrees. The rib 37 is greater in width than the engaging groove 36, and both are similar in configuration. According to this structure, when the blocks 30 are laid next to each other, the rib 37 and the engaging groove 36 which are intended to engage together establish face-to-face contact at the inclined surfaces, as shown in FIG. 5. Hence, the engagement between the rib 37 and the engaging groove 36 is stable and free from wobbliness. In addition, due to the difference between the width of the rib 37 and that of the engaging groove 36, a certain width of joint is defined between the adjacent side walls of the blocks 30. On the other hand, the side walls which are not involved in the engagement of the rib 37 and the engaging groove 36 are equipped with the projections 35 whose height is equal to the joint width. Therefore, when the blocks 30 are installed in an adjacent manner, a certain width of joint is also formed between these adjacent side walls. Accordingly, joints are defined in a certain width between adjacent blocks 30, in which the joint width is equivalent to the groove interval. As a result, the blocks 30 can be installed to create a grooved surface which is uniform on the whole and free from bumps. It should be noted that each side wall may have one or more projections 35. In addition, the block base 32 has a smooth and flat bottom surface 32b.

In order to provide the paving block base 32 with the engaging groove 36 and the rib 37, use is made of a vertically removable mold which corresponds to the cross section of the paving block base 32 and in which a suitable indent is formed in one of the inner mold walls for forming side walls which extend parallel to the removing direction of the vertically removable mold. By molding a material like concrete in the vertical mold, the paving block 30 with the engaging groove 36 and the rib 37 can be efficiently formed in an even thickness. At the same time, if the inner mold wall for the top surface of the paving block base 32 is grooved in correspondence with the grooves 33, the top surface of the paving block base 32 is dented entirely to provide the grooves 33 of the above structure.

Figure 6:
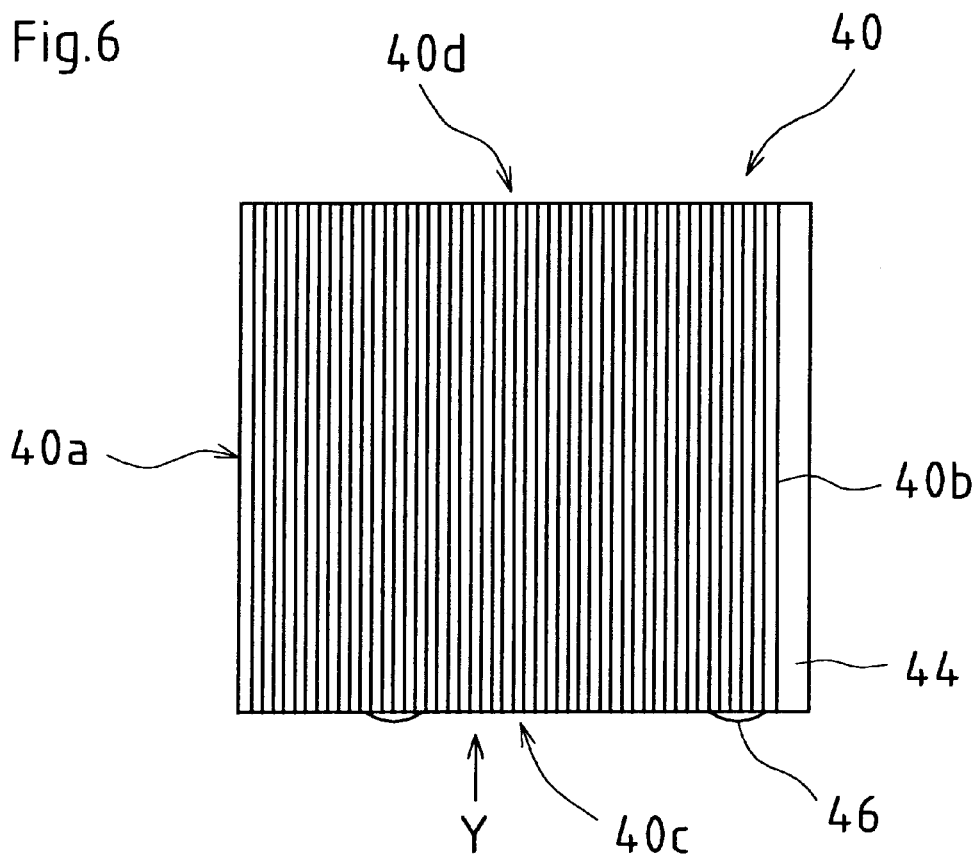
FIG. 6 is a plan view of a paving block according to the fourth embodiment of the present invention.
Figure 7:
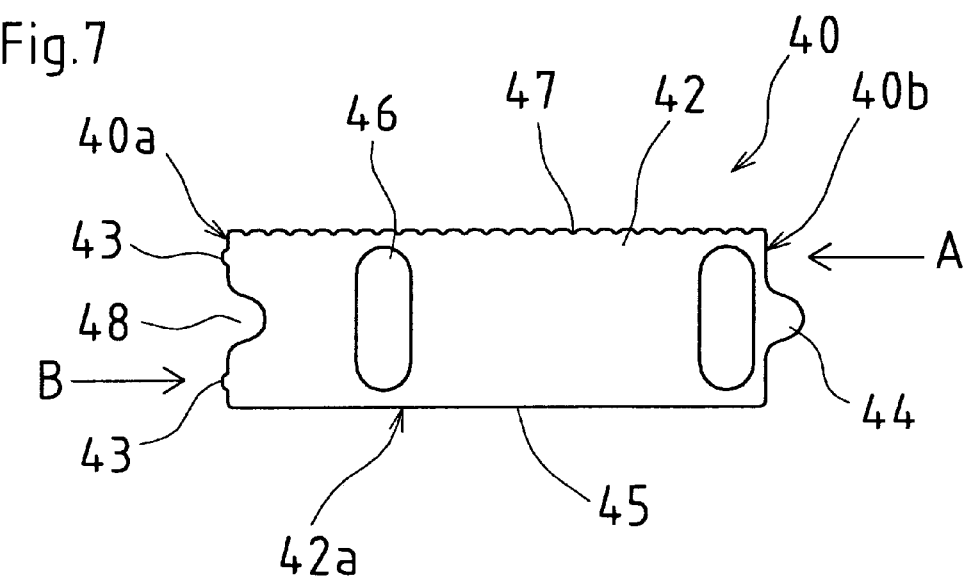
FIG. 7 is a side view of FIG. 6 taken in the direction of Arrow Y.

Further, the description is directed to the fourth embodiment. FIG. 6 is a plan view thereof. FIG. 7 is a side view of FIG. 6 taken in the direction of Arrow Y. FIGS. 8(a) and 8(b) are enlarged views of substantial portions at the end A and the end B in FIG. 7, respectively, and FIG. 8(c) shows an engaged state.

In a paving block 40, projections 43 having a height equal to a joint width extend perpendicularly from a side wall 40a which is formed with an engaging groove 48. The joint width is determined by these projections 43. Except this modification, the paving block 40 is similar to the paving block 30, and any further description is omitted.

Similar to the paving block 30 mentioned above, the paving block 40 is composed of a paving block base 42 of quadrangular prism shape and projections 46 for determining a joint width. The projections 46 are provided on side walls of the paving block base 42, each of which wall serves as an adjacent surface when installed. A plurality of grooves 47 are formed entirely across the top surface of the paving block base 42, each extending parallel to one side of the rectangular top surface and in an equal groove interval. A rib 44 extends along a side wall 40a which serves as an adjacent surface in the block base 42, while an engaging groove 48 is formed in an opposite side wall 40b.

The paving block 40 is characterized by the projections 43, which are provided, according to this embodiment, on the side wall 40a which includes the engaging groove 48. Alternatively, the projections 43 may be formed on the side wall 40b together with the rib 44.

On either of side walls 40c, 40d which are not involved in the engagement of the rib 44 and the engaging groove 48, projections 46 are formed in a height equivalent to the joint width. In this embodiment, the projections 46 locate on the side wall 40c. According to this structure, when the blocks 40 are laid next to each other, a certain width of joint is defined between these adjacent side walls. Thus, joints are formed in a certain width between adjacent blocks 40, in which the joint width is equivalent to the groove interval. As a result, the blocks 40 can be installed to create a grooved surface which is uniform on the whole and free from bumps. Compared with the paving block 30, additional similarities can be noted in that each of the side walls 40c, 40d may have one or more projections 46, and that the block base 40a have a smooth and flat bottom surface 42a.

FIG. 8(c) shows the joined state of the rib 44 and the engaging groove 48 when installed. To be specific, the rib 44 and the engaging groove 48 which are intended to engage together establish face-to-face contact at their inclined surfaces 44a, 48a. Hence, the engagement of the rib 44 and the engaging groove 48 is stable and free from wobbliness. At the same time, the projections 43 provide a certain width of joint between the side walls 40a, 40b. This joint can be obtained not only by providing the projection 43 on at least one of the side walls formed with the rib 44 or the engaging groove 48, but also by designing the height of the rib 44 greater by the joint width than the depth of the engaging groove 48 or by forming a projection which corresponds to the joint width at either the engaging groove 48 or the rib 44.

The constitution of the block 30 and the block 40 may be modified as shown in FIG. 9. In a paving block 50, the rib 37, 44 and the engaging groove 36, 48 locate below a center 502 of a paving block base 52. When subjected to an excessive load during installation or after service, this structure protects the upper surface of the engaging portion from breakage.

The block constitution of FIG. 9 may be further arranged as shown in FIG. 10. A block 60 includes diagonal notches 61a, 61b which are cut in the side walls below the rib 37 (44) and the engaging groove 36 (48). When installed, this arrangement prevents sand or other bed materials from entering the engaging portion, and thereby keeps the joint at a predetermined width.

Figure 11:
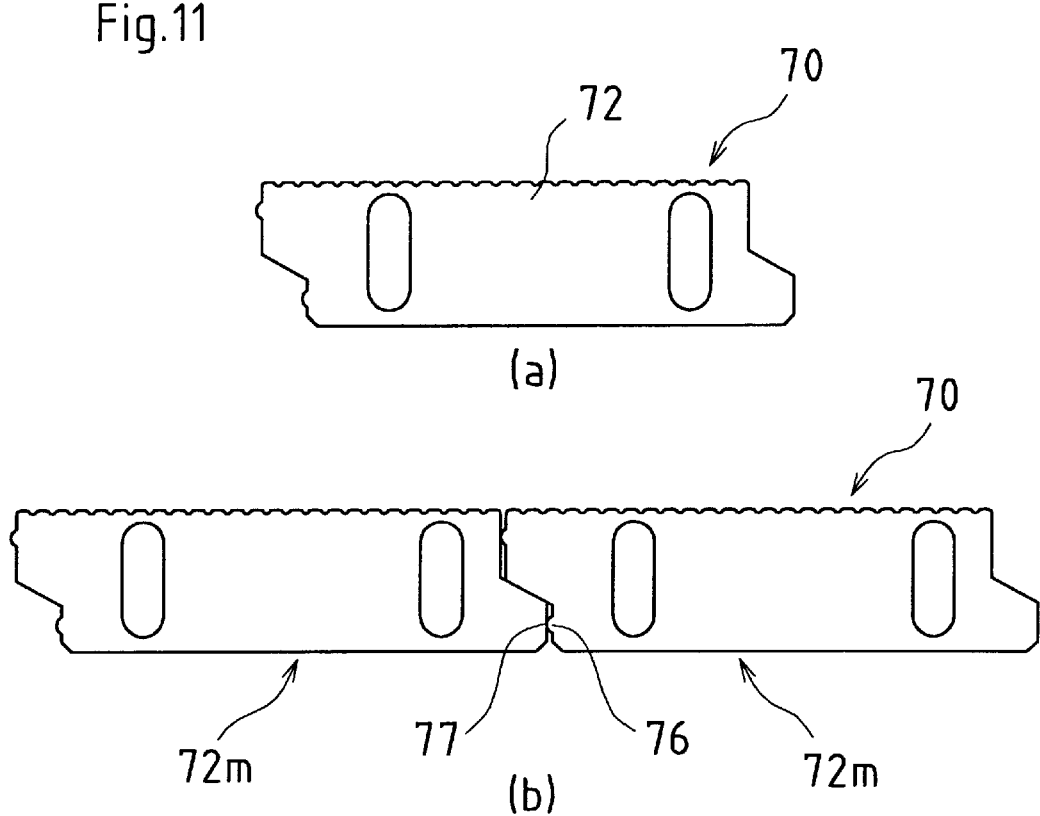
FIG. 11(a) is a side view of a paving block according to the seventh embodiment of the present invention.
FIG. 11(b) is a side view showing an installation of the seventh embodiment.

A block 70 shown in FIG. 11(a) represents still another mode of the rib and the engaging groove which is engageable therewith. A rib 77 shares a bottom surface 72m of a block base 72, and a notch 76 is shaped to embrace the rib 77. Compared with the above embodiments, this arrangement simplifies the fitting at the time of installation and provides an installation state as illustrated in FIG. 11(b).

Figure 12:
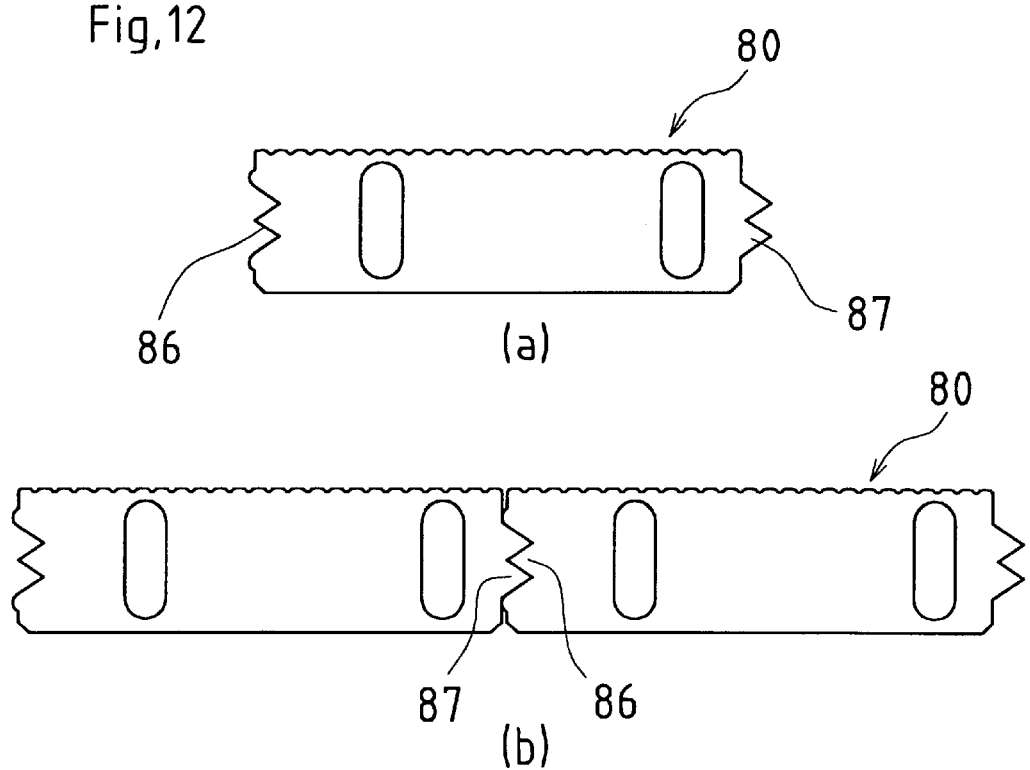
FIG. 12(a) is a side view of a paving block according to the eighth embodiment of the present invention.
FIG. 12(b) is a side view showing an installation of the eighth embodiment.

Moreover, as shown in FIG. 12, a block 80 may be formed with a rib 87 configured as two continuous protrusions and an engaging groove 86 shaped to embrace the rib 87. Owing to an improved interlocking effect, this constitution maintains a stable state as shown in FIG. 12(b) both during and after installation.

Furthermore, referring to FIG. 13, the blocks can be joined by means of a separate component or material.

A block 90 is based on the block 40 (see FIGS. 6 and 7) but comprises a recessed groove 93a (93b) instead of the rib 44. Namely, the recessed grooves 93a, 93b are formed in side walls 92a, 92b which serve as the joint surfaces of the block base 92, such that each recessed groove can cooperate with an adjacent block base to establish a joint portion. As shown by the block 50 of FIG. 9, the recessed grooves 93a, 93b locate below the center of the block base 92.

When the blocks 90 are laid next to each other, as illustrated in FIG. 14, there is created a cavity 99 which is sealed by the projection 94 and which serves as a mutually connectable joint portion. For installation, the blocks 90 are united by fitting the cavity 99 with a joint component 98 which matches the configuration of the cavity 99.

Instead of using the joint component 98, the joint portion and the joint can be integrally formed by filling and setting curable joint sand 97 in the cavity 99, as shown in FIG. 15. In this case, a block 100 does not have the projection 94 illustrated in FIG. 14, so that a cavity 109 opens at the top. With the blocks 100 arranged adjacently, curable joint sand 97 is poured into the cavity 109 through an opening 109a to give the joint portion and the joint as mentioned above.

<Description of Paving Block Installation Method>

FIG. 16(a) is a top view of a first laying pattern by an installation method for the paving blocks according to any of the third to the ninth embodiments, and FIG. 16(b) is a perspective view of a substantial portion thereof.

As shown in FIG. 16(b), in the first laying pattern, the paving blocks 30 are successively staggered, with the rib 37 being dislocated to the middle of the engaging groove 36. The first laying pattern can further prevent a bump or surface unevenness.

Figure 17:
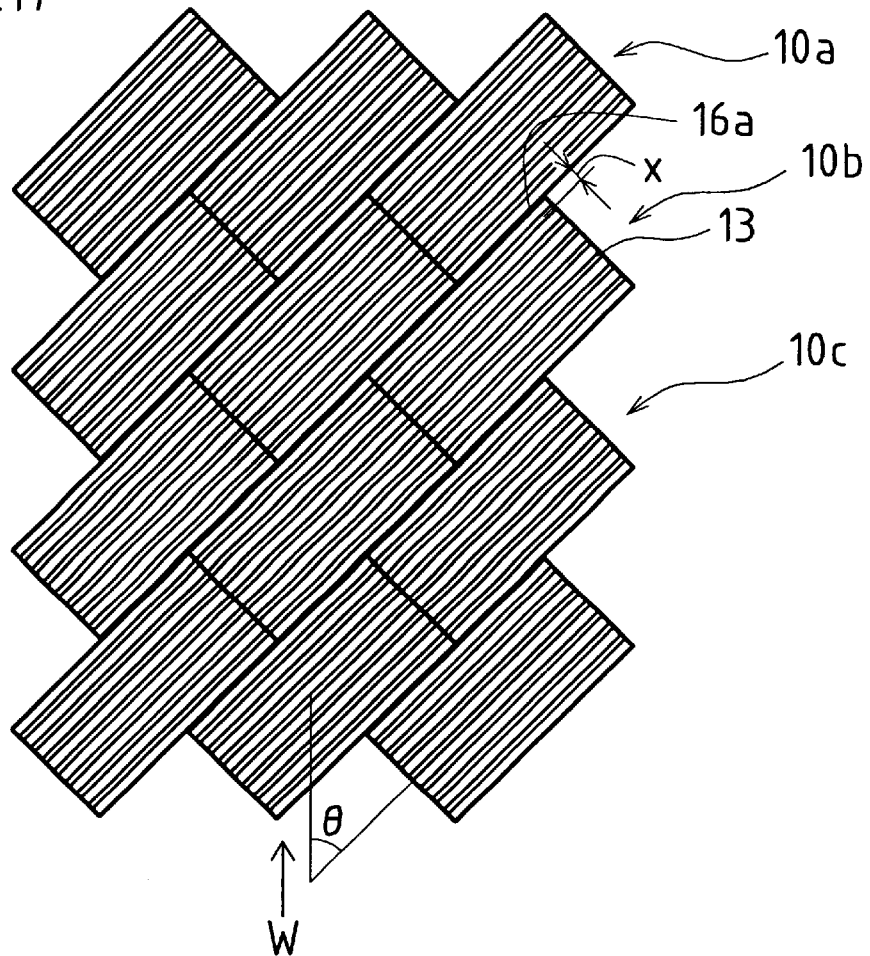
FIG. 17 is a top view of a second laying pattern by an installation method for the paving blocks according to any of the third to the ninth embodiments.

FIG. 17 is a top view of a second laying pattern by an installation method for the paving blocks according to any of the third to the ninth embodiments.

In the second laying pattern, the paving blocks 10a, 10b, 10c . . . are laid such that the grooves 13 run diagonally with respect to a direction of foot- or vehicle-traffic (Arrow W). The laying angle θ is preferably between 20° and 70°. The second laying pattern can suppress bounces of wheels of a passing vehicle, thereby weakening the impact to the wheels while crossing the grooves 13. Hence, it is effective in reducing shakes transmitted to a vehicle such as a wheelchair and a pushchair.

Figure 18:
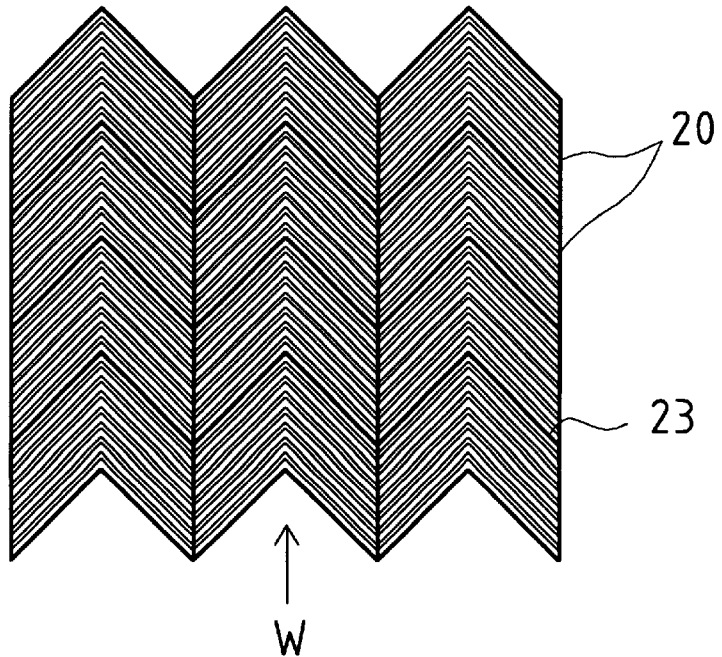
FIG. 18 is a top view of a third laying pattern by an installation method for the paving blocks according to the second embodiment.

FIG. 18 is a top view of a third laying pattern by an installation method for the paving blocks according to the second embodiment.

The third laying pattern of the block base is another arrangement for achieving the technological concept of the second laying pattern mentioned above. The blocks 20 are aligned in a direction of foot- or vehicle-traffic (Arrow W), so that the grooves 13 extend in a diagonal direction.

This arrangement achieves an effect similar to that of the second laying pattern.

<Description of Examples Using the Paving Blocks and the Installation Methods of the Present Embodiments>

Example 1

Blocks 10, see FIGS. 1, 2 and 17

A paving block 10 was prepared by using a paving block base 32 which presented a rectangular shape in plan view (long sides 198 mm, short sides 98 mm), wherein the top surface of the paving block base 12 was formed with eighteen grooves 13 (width 3 mm, depth 1 mm) running parallel to the long sides in intervals of 5.105 mm, and wherein the top four sides of the paving block base 12 were chamfered. The paving blocks 10 were laid in an angle of 45 degrees to the foot-traffic direction on a pavement, each leaving a 2-mm joint 16a with respect to an adjacent paving block 10. The joint 16a and an adjacent ridge 14 gave an interval x of 6 mm, so that the joint 16a did not stand out distinctively from the grooves 13. As a test, a wheelchair was pushed on this block-laid pavement. It was observed that the joints were less wobbly, shaky, etc., and gave no uncomfortable feeling of shakes.

Example 2

Blocks 30, see FIGS. 4 and 16

A paving block 30 was prepared by using a paving block base 32 which presented a rectangular shape in plan view (long sides 198 mm, short sides 98 mm), wherein the top surface of the paving block was formed with eighteen grooves 13 (width 3 mm, depth 1 mm) running parallel to the long sides in intervals of 5.105 mm, and wherein the top four sides of the paving block base 12 were chamfered. In the block base 32 of the paving block 30, one of the longitudinal side walls was provided with an engaging groove 36 (opening width 24 mm, bottom width 15 mm, depth 15 mm), and the opposite side wall was equipped with a rib 37 (top width 16 to 17 mm, bottom width 25 to 26 mm, height 15 mm). A 2-mm joint was created between adjacent paving blocks 30 simply by engaging the engaging groove 36 and the rib 37 of the adjacent paving blocks 30. Since the block-paved surface is integrated by the engagement between the engaging groove 36 and the rib 37 of the adjacent paving blocks 30, the paving blocks 30 prevent bumps when installed and thus exhibits an excellent installation property. Formation of bumps can be further avoided by staggering the paving blocks 30 each formed with the engaging groove 36 and the rib 37.

Example 3

Blocks 40, see FIGS. 6, 7 and 16

For a paving block 40, use was made of a paving block base 42 which presented a square shape in plan view (side 198 mm each), wherein one side wall 40a was provided with an engaging groove 48 (opening width 19.5 mm, bottom width 9.5 mm, depth 12.5 mm), and also formed with horizontally extending projections 43 (height 2 mm), and wherein the opposite side wall 40b was equipped with a rib 44 (top width 10 mm, bottom width 20 mm, height 12.5 mm). Besides, in the top surface of the paving block base 42, twenty-three grooves 47 (width 4 mm, depth 1.5 mm) were formed parallel to one of the sides in intervals of 8 mm, thereby to give the paving block 40. A 2-mm joint was defined between adjacent paving blocks 40 simply by engaging the engaging groove 48 and the rib 44 of the adjacent blocks 40. The block-paved surface was integrated by the engagement between the engaging groove 48 and the rib 44 of the adjacent paving blocks 40. After installation, the paving blocks 40 exhibited no bump or surface unevenness due to wobbliness or inclination and did not obstruct foot-passage. Prevention of a bump or surface unevenness can be encouraged further by staggering the paving blocks 40 each formed with the engaging groove 48 and the rib 44.

When the paving blocks 40 were laid 45 degrees to the foot-traffic direction, they caused less shakes to a wheelchair, a pushchair or the like which was passing thereon, whereby uneasiness was not felt any longer.

INDUSTRIAL APPLICABILITY

A bump-free even-surface structure is achieved by the use of the paving blocks of the present invention according to the installation method of the present invention. The resulting paved surface is safe and highly functional, which does not bother such vehicles as a wheelchair and a pushchair with unwanted shakes. It is also effective in terms of simple installation.

What is claimed is:

1. A paving block, comprising:

a prism-shaped paving block body extending along and about a horizontal axis x, a transverse axis y and a vertical axis z perpendicularly intersecting one another at a common point and having a top surface extending in an x direction and a y direction, a bottom surface disposed opposite the top surface and extending in the x direction and the y direction, a first pair of opposing side walls extending in the x direction and a z direction and a second pair of opposing side walls extending in the y direction and the z direction, the first and second pair of opposing side walls disposed between the top and bottom surfaces, with respective ones of the first pair of opposing side walls and the second pair of opposing side walls connected perpendicularly to each other, the top surface having a plurality of grooves which extend parallel to each other in the y direction and uninterruptedly across the top surface commencing at one side wall and terminating at an opposite side wall, each one of the plurality of grooves having a width substantially equal to each other; and at least one projection which is located between the top and bottom surfaces and which abuts on at least one of the side walls of the first pair of opposing side walls, the at least one projection projecting from the at least one side wall of the first pair of opposing side walls a distance equal to or substantially equal to the width of the grooves, the at least one projection extending at least substantially between the top and bottom surfaces in the z direction to define a projection height and having a projection width extending in the x direction, the projection height being larger than the projection width, one side wall of the second pair of opposing side walls is formed with a rib extending in the y direction parallel to the plurality of grooves for engaging the block with an adjacent block, and a remaining side wall of the second pair of opposing side walls is formed with an engaging groove extending in the y direction parallel to the plurality of grooves for engaging with a rib of another adjacent block, the rib extending continuously across the one side wall of the second pair of opposing side walls, with two ends thereof located at connection areas where the one side wall joins the side walls of the first pair of opposing side walls, and the engaging groove extending continuously across the remaining side wall of the second pair of opposing side walls, with two ends thereof located at connection areas where the remaining side wall joins the side walls of the first pair of opposing side walls.

2. A paving block according to claim 1, wherein the rib and the engaging groove located below a center of the side walls.

3. A paving block according to claim 1 or 2, wherein a notch is provided at the bottom of each one of the second pair of opposing side walls, the notch extending along in the y direction adjacent to and below a respective one of the rib and the engaging groove entirely across each one of the second pair of opposing side walls and between the first pair of opposing side walls.

4. A paving block according to claim 1 or 2, wherein the rib is configured in cross-section generally as a trapezoid with inclining surfaces, the engaging groove of another adjacent block configured to engage in face-to-face contact with the inclining surfaces.

* * * * *